United States Patent [19]
Lu

[11] Patent Number: 6,100,918
[45] Date of Patent: Aug. 8, 2000

[54] VIDEO CONFERENCING SYSTEM AND METHOD

[76] Inventor: Jason Lu, 6089 E. Silverspur Trail, Anaheim, Calif. 92807

[21] Appl. No.: 09/060,236

[22] Filed: Apr. 14, 1998

[51] Int. Cl.[7] ............................................. H04N 7/14
[52] U.S. Cl. ............................................. 348/15; 348/14
[58] Field of Search ......................... 379/92.03, 93.01, 379/93.08–93.09, 93.12, 93.14, 93.21, 93.23, 93.25, 202–207, 265, 93.28; 348/14–20; 370/493–495, 535–536, 542–544, 401; 340/825.34, 825.36–825.37, 825.44

[56] References Cited

U.S. PATENT DOCUMENTS

| | | | |
|---|---|---|---|
| 5,410,343 | 4/1995 | Coddington et al. | 379/93.12 |
| 5,625,677 | 4/1997 | Feiertag et al. | 379/93.28 |
| 5,636,218 | 6/1997 | Ishikawa et al. | 370/401 |
| 5,929,897 | 7/1999 | Schneider et al. | 379/265 |

*Primary Examiner*—Curtis A. Kuntz
*Assistant Examiner*—George Eng
*Attorney, Agent, or Firm*—Hovey, Williams, Timmons & Collins

[57] ABSTRACT

A preferred video conferencing system (10) includes a plurality of customer stations (14) selectively coupled with at least one local video conferencing station (20) that routes service requests from the customer stations (14) to a remote server computer (24). The server computer (24), in turn, activates a pager (42) to provide the service request including data identifying the requesting customer station to a service provider. In response, the service provider originates video conferencing traffic from a selected remote video conferencing station (22) using the identifying data. In response, the remote conferencing station (22) originates a call over the network to the local station (20) and provides originating video conferencing traffic to the local station (20). The local station (20) routes the video traffic to the selected customer station (14).

8 Claims, 1 Drawing Sheet

VIDEO CONFERENCING SYSTEM AND METHOD

RELATED APPLICATIONS

Not applicable.

FEDERALLY SPONSORED RESEARCH OR DEVELOPMENT

Not applicable.

MICROFICHE APPENDIX

A microfiche appendix as Appendix 1 containing a source code of a computer program useful in accordance with the present invention is appended hereto as 2 sheets of microfiche containing 134 frames.

BACKGROUND OF THE INVENTION

1. Field of the Invention

The present invention relates to the field of video conferencing.

2. Description of the Prior Art

Some video conferencing situations only require one way transmission of video, that is, from one party to the other. Such may be the case with educational lectures and entertainment, for example. However, prior art video conferencing between two parties requires that both be present at a video conferencing station. This leads to unnecessary expense and inconvenience.

SUMMARY OF THE INVENTION

The present invention solves the prior art problems mentioned above and provides a distinct advance in the state of the art. In particular, the video conferencing system hereof provides for efficient and convenient video conferencing in which only one way transmission of video is required.

The preferred video conferencing apparatus includes a local video conferencing station connected with a plurality of customer stations. Each customer station includes a video unit operable for displaying video received over a video path and a voice unit operable for providing voice communications received over a separate voice path. In preferred forms, the video paths includes cable TV lines and the voice paths include PBX-switched telephone lines for duplex voice communications. The video conferencing station receives video conferencing traffic from a telecommunications network, derives video and voice traffic and routes this traffic to a selected customer station separately over the video and voice paths.

In preferred forms, the video conferencing traffic is received in response to a service request initiated by the selected customer station. The local video conferencing station routes the service request over the network to a remote server computer that responds by activating a pager to display the service request, including data identifying the customer station, to a service provider. The service provider then selects a remote video conferencing station and enters the identifying data. This remote station responds by placing a call and providing originating video conferencing traffic over the network to a local station. The local station responds by routing the video and voice traffic to the selected customer station. Other preferred aspects of the present invention are disclosed herein.

DETAILED DESCRIPTION OF THE PREFERRED EMBODIMENT

Figure 1:
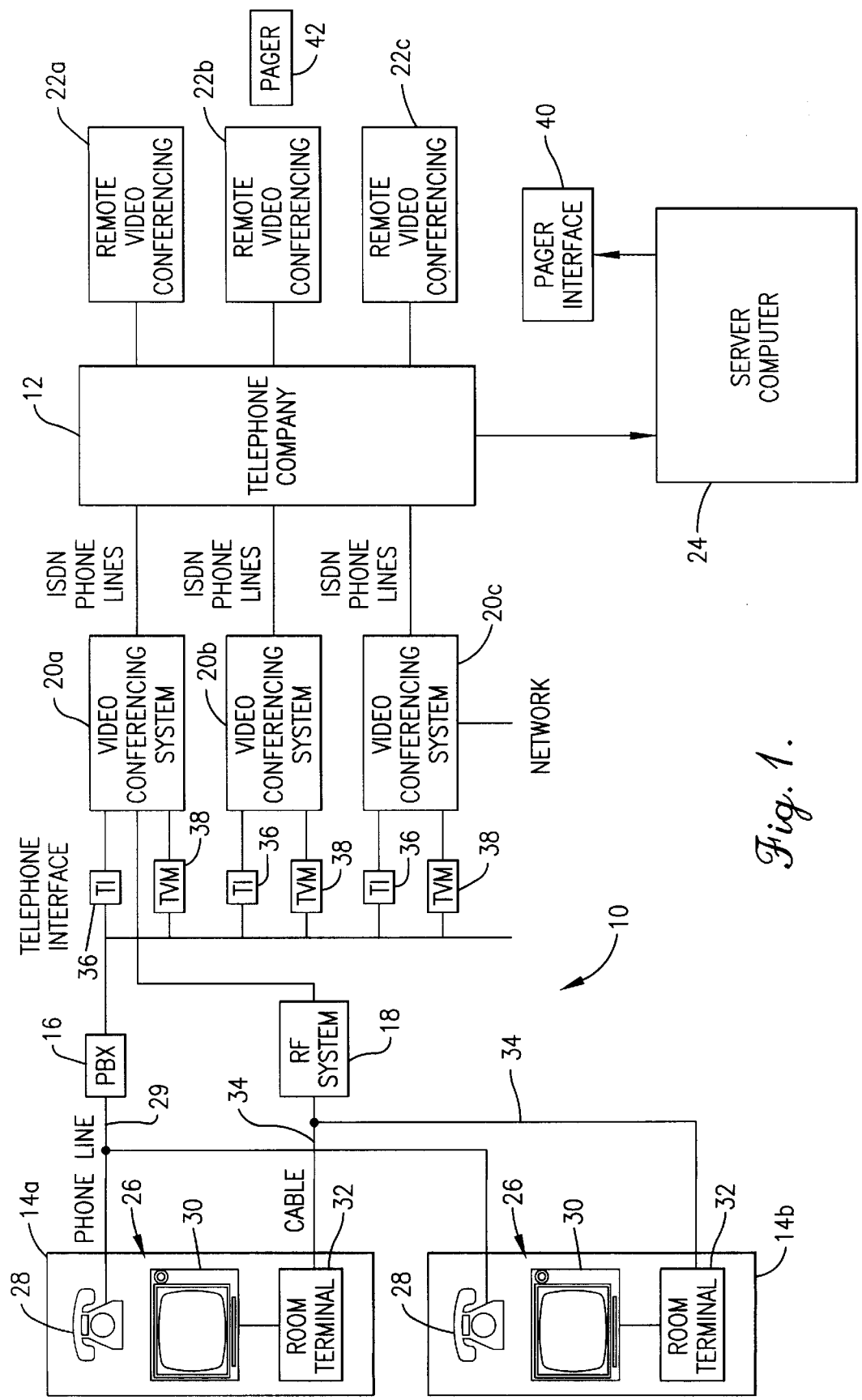
FIG. 1 is the only drawing figure and is a block diagram illustrating the preferred video conferencing system in accordance with the present invention.

FIG. 1 illustrates preferred video conferencing apparatus 10 in accordance with the present invention. Apparatus 10 is preferably connected to a telecommunications network 12. Apparatus 10 broadly includes a plurality of customer stations 14 (individually 14a and 14b), PBX 16, RF system driver 18, a plurality of local video conferencing stations (VCS) 20 (individually 20a, 20b, and 20c), a plurality of remote video conferencing stations (RVC) 22 (individually 22a, 22b and 22c), and server computer 24.

Each customer station 14 includes video unit 26 and voice unit 28. The preferred video unit 26 includes a television 30 and a TV signal terminal 32 such as a PHONOVIEW terminal model HB7020-1 operable for tuning the TV to the CATV channel predefined for the VCS. Preferred voice unit 38 includes a telephone.

As illustrated in FIG. 1, coaxial cable 34 connects each VCS 20 with each terminal 32 by way of a respective TVM 38. The voice units 28 of each customer station are connected by telephone lines 29 to a switching device, preferably PBX 16. RF system driver 18 is preferably PHONOVIEW model SD74-S. The function of the RF module is to instruct customer stations to tune to the channel used by the VCS. There is only one RF module which is connected to and controlled by one of the VCS, which are all networked to share the functionality of the RF module.

Each VCS 20 and RVC 22 is a video conferencing unit such as a personal computer equipped with a VC card connected to telecommunications network 12 by ISDN telephone lines. Telephone interfaces 36 (model TELTONE T-311) interconnect each VCS 20 with PBX 16, and television modules (TVM) 38 (model SAM-5M) serve as an interface between each VCS 20 and cable system 34.

Server computer 24 is preferably a PENTIUM microprocessor-based server. A pager interface 40 such as a US Robotics modem is connected to server computer 24 and is operable for dialing a pager service and providing data thereto for subsequent display on pager 42.

In use, customer stations 14 can be located in each room of a hotel, for example, and the plurality of VCS 20 centralized in a switch room. In this environment of use, PBX 16 is the hotel PBX connected by telephone lines 29 to each room telephone as voice units 28. Also, conventional television programming is provided over cable 34.

In operation, VCS 20, RVC 22 and server computer 24 operate under the control of programming illustrated in the attached microfiche appendix included as part of the disclosure hereof. A hotel occupant in a room having customer station 14a, for example, and wanting teleconferencing services, initiates service by taking the voice unit 28, that is, the room telephone, off hook and dialing a designated extension number. PBX 16 routes this call by way of interface 36 to an idle video conferencing station such as VCS 20a.

VCS 20a responds with voice prompts asking the caller to enter, by way of the telephone keypad, a service request representative of the desired teleconferencing service and other information such as room number and credit card data in order to pay for the service. The caller can view instructions, presentations, services available, and data on TV 30 during the ordering process.

In response to data entry by the customer, VCS 20a allocates a video channel (typically pre-allocated) to the requesting customer station as part of the video path, and sends the service request over telecommunications network 12 to server computer 24. In preferred forms, the VCS accesses server computer 24 by way of the internet and displays the web pages of server computer 24 to the customer on the associated television 30. The customer can then make selections by pressing the appropriate buttons on the telephone keypad in order to make the service request. The service request includes data representative of the specific service, the credit card information and information identifying station 14a (such as the customer's room number or telephone number) as the station requesting the service.

Upon receipt of the service request, server computer 24 verifies the credit card through a conventional verification service and if valid, initiates a pager output to pager interface 40. At this time, the caller is prompted to hang up, that is, place voice unit 28 on hook. However, the telephone line connection remains between PBX 16 and VCS 20a. In this way, PBX 16 responds to a call from other customer stations 14 by noting that VCS 20a is busy and routes the call to an idle VCS.

The pager output includes the service request and associated data identifying station 14a as the requesting station and is sent by interface 40 to a pager service. In turn, the pager service activates pager 42 to display the service request and associated data. The server computer provides a login/logout system for service providers through internet web pages. Through this system, a service provider can indicate availability for providing video conferencing services. Upon successful login/logout, the server computer sends a pager notification to the service provider for confirmation.

In preferred forms, pager 42 is carried by the service provider which might be an educational speaker or entertainer, for example. The service provider then accesses an available remote video conferencing station such as RVC 22a. As will be appreciated, the service provider can approach any available RVC 22 no matter where located although typically, all will be located at the same remote site.

The service provider accesses RVC 22a by entering the service request and associated data displayed on pager 42. In response, RVC 22a accesses a look-up table stored in a memory device thereof, such as the hard drive. The look-up table stores telephone numbers in association with customer stations and video conferencing stations for hotels and others who have subscribed to the teleconferencing service. Upon retrieving the telephone number associated with customer station 14a, RVC 22a places a call to this number, which is the telephone number of VCS 20a. In other words, RVC 22a originates the video conferencing call in response to the service request placed by the customer over a conventional telephone line.

VCS 20a receives the call ringing in from RVC 22a. In response, VCS 20a places a call by way of PBX 16 to voice unit 28 of customer station 14a. The customer, upon answering the call, is asked to key in identifying data such as the last four numbers of the credit card used in the service request. This is to verify that the correct customer station has been identified for the video conferencing service.

Upon receiving verification, VCS 20a then answers the call back and enables video transmission by way of cable system 34 over the allocated channel to the video unit 26 of customer station 14a and notifies RVC 22a that service can commence. RVC 22a then provides video conferencing traffic over network 12 to VCS 20a.

VCS 20a processes the video conferencing traffic to derive video traffic and voice traffic therefrom. VCS 20a provides the video traffic by way of TVM 38 and coaxial cables 34 as the video path to terminal 32, which responds by presenting the video on the screen of TV 30 of customer station 14a. Similarly, VCS 20a provides the voice traffic by way of PBX 16 and telephone lines 29 as the voice path to voice unit 28 of customer station 14a.

The video displayed on TV 30 is that provided by the service provider at RVC 22a. This is enabled by the present invention without requiring both parties to be present at a video conferencing station. However, voice unit 28, as a conventional telephone, enables duplex voice communication between the parties. In this way, the present invention provides video conferencing in an efficient and economical manner.

Upon completion of the video conference, the customer places voice unit 28 on hook. This prompts VCS 20a to terminate the call. This also tolls the costs being charged to the customer's credit card. Call logging can be performed by each local VCS. The call duration is emailed to the server computer for accounting and credit card billing.

With the present invention, each local VCS 20 can provide service to a plurality of customer stations. This enables a more efficient use of equipment leading to efficiency and greater economy.

Those skilled in the art will appreciate that the present invention encompasses many variations in the preferred embodiment described herein. For example, the customer stations do not need to be located in the same building nor do the video conferencing stations. Moreover, the service provider can be notified of a service request using a wide variety of techniques such as email, fax, print and the like. Moreover, the invention can be implemented using conventional cable company and local exchange carrier facilities to provide service to individual homes and offices, for example. Also, out of band channels can be used on the cable system to provide customer side video and, in this way, full duplex video conferencing is available. The service can then used between two users served by different cable companies for general video conferencing. Having thus described the preferred embodiment, the following is claimed as new and desired to be secured by Letters Patent:

What is claimed is:

1. A video conferencing apparatus for use with a telecommunications network, said apparatus comprising:

a video conferencing station operable for receiving from the network video conferencing traffic and for deriving video traffic and voice traffic therefrom; and a plurality of customer stations each including
a video unit having a screen, coupled with said video conferencing station by way of a video path, and operable for displaying on said screen video derived from video traffic received over said video path, and
a voice unit coupled with said video conferencing station over a voice path and operable for providing voice communications derived from voice traffic received over said voice path, a server computer operable for receiving a service request and for providing a prompt to originate said video conferencing traffic;

for providing said service request to a service provider a pager;

said video conferencing station being operable for receiving from the network video conferencing traffic designated for a selected one of said customer stations, for deriving video and voice traffic from said video conferencing traffic, and for delivering said traffic to voice traffic to the respective video and voice units of said selected customer station separately over said video and voice paths;

said video conferencing traffic being received in response to said service request, said video conferencing station being operable for receiving said service request from said selected customer station and providing said service request to the network for delivery to a source of said video conferencing traffic;

said server computer being operable for initiating a wireless signal to activate said pager with identifying data corresponding to said selected customer station as said prompt.

2. The apparatus as set forth in claim 1, said video conferencing station being a first station, said apparatus further including a second station for originating said video conferencing traffic over the network in response to input from a service provider responding to said prompt.

3. The apparatus as set forth in claim 2, said input including said identifying data, said second station being operable for using a dialing number to dial said first station in accordance with said identifying data.

4. The apparatus as set forth in claim 3, said second station including a memory device for retrievably storing dialing numbers in association with identifying data corresponding respectively to said customer stations.

5. The apparatus as set forth in claim 4, said video path including coaxial cable interconnecting said video conferencing station and each video unit of said customer stations, said apparatus further including a plurality of telephone lines as said voice paths interconnecting the respective voice units of said customer stations with a PBX, said video conferencing station being coupled with said PBX, said PBX being operable for routing voice traffic from said video conferencing station to the voice unit of said selected customer station, said video traffic being encoded, the video unit of said selected customer stations being operable for decoding said video traffic in order to prevent intelligible display of said video traffic by the video units of the others of said customer stations.

6. A video conferencing method for use with a telecommunications network, said method comprising the steps of:

(a) initiating a service request for video conferencing services by a user at a selected customer station, said selected customer station being one of a plurality of customer stations, there being a first video conferencing station operable for receiving from the network video conferencing traffic and for deriving video traffic and voice traffic therefrom, each of said customer stations including
a video unit having a screen, coupled with said video conferencing station by way of a video path, and operable for displaying on said screen video derived from video traffic received over said video path, and
a voice unit coupled with said video conferencing station over a voice path and operable for providing voice communications derived from voice traffic received over said voice path, step (a) including the step of initiating said service request using the voice unit at said selected customer station, (b) routing said service request from said selected customer station over a voice path to said first video conferencing station and from there, over the network to a server computer;

(c) responding in the server computer to said service request by providing said service request to a service provider by activating a pager to present said service request, said service request including identifying data corresponding to said selected customer station;

(d) said service provider accessing a second video conferencing station connected to the network by entering said service request and identifying data;

(e) in said second video conferencing station connected to the network, placing a call over the network to the first video conferencing station in response to receipt of said service request and identifying data, and originating video conferencing traffic designated for said selected customer station;

(f) in response to receipt of said call, at said first video conferencing station deriving video traffic and voice traffic from said video conferencing traffic and delivering said video and voice traffic to the respective video and voice units of said selected customer station separately over said video and voice paths.

7. The method as set forth in claim 6, said first video conferencing station being connected to a PBX, the voice units of said customer stations being connected to said PBX by respective telephone lines, step (b) further including the steps of placing the telephone unit of said selected customer station on hook after entry of said service request.

8. The method as set forth in claim 7, step (b) including the step of maintaining an off hook connection between said PBX and said first video conferencing station.

* * * * *